United States Patent
Pouyau et al.

(10) Patent No.: US 9,816,461 B2
(45) Date of Patent: Nov. 14, 2017

(54) EXHAUST CENTERBODY FOR A TURBINE ENGINE

(71) Applicant: SNECMA, Paris (FR)

(72) Inventors: Guillaume Pouyau, Paris (FR); Nicolas Sirvin, Brunoy (FR)

(73) Assignee: SNECMA, Paris (FR)

(*) Notice: Subject to any disclaimer, the term of this patent is extended or adjusted under 35 U.S.C. 154(b) by 320 days.

(21) Appl. No.: 14/339,846

(22) Filed: Jul. 24, 2014

(65) Prior Publication Data
US 2015/0101338 A1    Apr. 16, 2015

(30) Foreign Application Priority Data

Jul. 24, 2013 (FR) ...................................... 13 57313

(51) Int. Cl.
| | |
|---|---|
| F02K 1/04 | (2006.01) |
| F02K 1/82 | (2006.01) |
| F01D 25/30 | (2006.01) |
| F01D 5/14 | (2006.01) |
| B64D 33/04 | (2006.01) |
| F01D 17/10 | (2006.01) |
| F01D 17/14 | (2006.01) |

(Continued)

(52) U.S. Cl.
CPC ................ F02K 1/04 (2013.01); B21D 53/84 (2013.01); B23P 23/00 (2013.01); B64D 33/04 (2013.01);
(Continued)

(58) Field of Classification Search
CPC ........ F01D 25/04; F01D 25/30; F01D 25/305; F01D 5/143; F02K 1/04; F02K 1/82; F02K 1/78; B21D 53/84; F05D 2270/17
See application file for complete search history.

(56) References Cited

U.S. PATENT DOCUMENTS

| | | | | |
|---|---|---|---|---|
| 2,928,235 A | * | 3/1960 | Johnson | F02K 1/04 239/265.25 |
| 3,625,630 A | * | 12/1971 | Soo | F01D 25/30 415/199.5 |

(Continued)

FOREIGN PATENT DOCUMENTS

JP    2001140697 A  *  5/2001  ............... F02K 1/04

OTHER PUBLICATIONS

French Preliminary Search Report dated May 19, 2014, in French Application No. 13 57313 dated Jul. 24, 2013 (with English Translation of Categories of Cited Documents).

*Primary Examiner* — Gerald L Sung
*Assistant Examiner* — Alain Chau
(74) *Attorney, Agent, or Firm* — Oblon, McClelland, Maier & Neustadt, L.L.P.

(57) ABSTRACT

An exhaust centerbody for a turbine engine is provided. The centerbody includes a truncated downstream part, which is connected to an upstream part by an annular ridge marking a discontinuity between the outer surfaces of the upstream and downstream parts. The outer surface of the downstream part has a substantially conical general shape, of which the tip is oriented downstream and is positioned in the region of the axis A, the axial half-section of this outer surface defining a line of which the upstream end part is substantially tangential to a straight line passing through the ridge and forming a non-zero angle α with a tangent to the outer surface of the upstream part, in the region of the ridge, and of which the downstream end part is substantially tangential to a straight line passing through the tip and forming a non-zero angle β with the axis A.

7 Claims, 3 Drawing Sheets

(51) Int. Cl.
 *F01D 25/04* (2006.01)
 *B21D 53/84* (2006.01)
 *B23P 23/00* (2006.01)

(52) U.S. Cl.
 CPC ............ *F01D 5/143* (2013.01); *F01D 17/10* (2013.01); *F01D 17/141* (2013.01); *F01D 17/145* (2013.01); *F01D 25/04* (2013.01); *F01D 25/30* (2013.01); *F02K 1/82* (2013.01); *Y02T 50/671* (2013.01); *Y02T 50/673* (2013.01); *Y10T 29/49323* (2015.01)

(56) References Cited

U.S. PATENT DOCUMENTS

| | | | |
|---|---|---|---|
| 4,244,294 A * | 1/1981 | Frignac | F02K 1/08 102/374 |
| 6,260,352 B1 | 7/2001 | Negulescu et al. | |
| 2008/0073099 A1 * | 3/2008 | Howard | H02G 3/0412 174/28 |
| 2009/0107557 A1 | 4/2009 | Conners | |
| 2009/0126366 A1 * | 5/2009 | Farber | F01D 25/30 60/694 |
| 2009/0246010 A1 * | 10/2009 | Roach | F01D 25/30 415/207 |
| 2010/0043389 A1 | 2/2010 | Conners | |
| 2011/0058939 A1 * | 3/2011 | Orosa | F01D 25/305 415/208.1 |
| 2012/0118345 A1 * | 5/2012 | Stoia | F01D 5/284 136/205 |
| 2012/0144836 A1 * | 6/2012 | Ress, Jr. | F01D 25/30 60/767 |
| 2013/0118594 A1 | 5/2013 | Conners | |

* cited by examiner

EXHAUST CENTERBODY FOR A TURBINE ENGINE

TECHNICAL FIELD

The present invention relates to an exhaust centerbody for a turbine engine, such as an aircraft turbojet or turboprop engine.

PRIOR ART

An exhaust centerbody, also referred to as an exhaust cone (or plug), is positioned downstream of the turbine engine and is generally surrounded by the nozzle of the turbine engine, defining, together with said nozzle, an exhaust channel for the combustion gases from the engine.

In general, a centerbody has a conical general shape of which the tip is oriented downstream and of which the upstream end is fixed to an exhaust housing of the turbine engine.

It has already been proposed to axially shorten the exhaust centerbody of a turbine engine, in particular to reduce the mass thereof and to reduce the dynamic risks in the event of imbalance.

However, within the context of calculations that are carried out to estimate the performance of a shortened body of this type, it has been noted that the shortened body generates significant separations of the flow of the gas stream. Separations of this type affect the performance of the turbine engine. The patent application FR 12 57739 by the applicant describes in particular a shortened exhaust centerbody and provides an alternative solution that limits said separation by boundary layer suction of an air stream circulating on the outer surface of the body.

The above-mentioned separations bring about a risk to the dynamics of the entire engine, since they may produce vibrations owing to the unsteady nature thereof (it being possible for the axial position of the separation front to vary over the outer surface of the body).

The object of the present invention is in particular to provide a simple, effective and economical solution to these problems.

DISCLOSURE OF THE INVENTION

The invention proposes an exhaust centerbody for a turbine engine, having rotational symmetry about a longitudinal axis A, characterised in that it comprises an upstream annular part and a truncated downstream annular part, said downstream annular part being connected to the upstream annular part by an annular ridge marking a discontinuity in curvature between the outer surfaces of the upstream and downstream annular parts, the outer surface of the downstream part having a substantially conical general shape, of which the tip is oriented downstream and is positioned substantially in the region of the axis A, the axial half-section of this outer surface defining a line of which the upstream end part is substantially tangential to a first straight line passing through the annular ridge and forming a non-zero angle α having a tangent to the outer surface of the upstream part, in the region of the annular ridge, the downstream end part of said line being substantially tangential to a second straight line passing through the above-mentioned tip and forming a substantially non-zero angle β with the axis A.

According to the invention, the exhaust centerbody has a downstream truncation, that is to say it comprises two axial parts, upstream and downstream respectively, which are delimited from each other by a marked annular ridge, sharp or not. This ridge marks a discontinuity, in particular in curvature, between the outer surfaces of said upstream and downstream parts. Although this ridge may have a rounded, convex apex, it does not constitute a smoothing region or a transition-curve region between the upstream and downstream parts. On the contrary, it marks a clear interruption in the curvature of the upstream part of the centerbody.

The invention allows the upstream axial position of the flow separations to be precisely defined, this position corresponding to that of the ridge of the centerbody. Indeed, the ridge produces an annular region promoting the flow separations and limiting or even preventing the displacement of the front of the region of flow separation, thereby leading to a significant reduction in vibrations.

The truncated part of the body is designed to optimise the performance of the turbine engine, and in particular to maximise the pressure recovery on the body, which contributes to the thrust of the engine. The shape of this truncated part is defined in an axial section through half (axial half-section) of the outer surface of this part, that is to say by the outline or line produced by the outer surface of said part intersecting with a half-plane along the longitudinal axis of the body (and passing through an upper or lower half of the body). Each outline or line extends from the above-mentioned ridge towards the inside and downstream, as far as the axis A.

The above-mentioned line may have a substantially undulating shape. The upstream end part of said line may have a concavity oriented downstream and the downstream end part of said line may have a convexity oriented downstream. The line may be obtained by polynomial interpolation.

The angle α may be between 20 and 90°, preferably between 30 and 70°, and more preferably between 35 and 55°. The angle β may be between 10 and 90°, preferably between 40 and 80°, and more preferably between 50 and 70°.

The present invention also relates to a turbine engine, such as an aircraft turbojet or turboprop engine, characterised in that it comprises a centerbody as described above.

The present invention also relates to a method for designing an exhaust centerbody for a turbine engine, said centerbody having rotational symmetry about a longitudinal axis A, characterised in that it comprises the steps of:

a) determining a position on the axis A, downstream of which the body will comprise a truncated part and in the region of which the body will have an annular ridge marking a discontinuity in curvature between the outer surfaces of the upstream and downstream parts of the body, and b) designing the truncated downstream part of the body, the outer surface of this part having a substantially conical general shape, of which the tip is oriented downstream and is positioned substantially in the region of the axis A, the axial half-section of this outer surface defining a line of which the upstream end part is substantially tangential to a first straight line passing through the above-mentioned annular ridge and forming a non-zero angle α having a tangent to the outer surface of the upstream part, in the region of the annular ridge, and of which the downstream end part is substantially tangential to a second straight line passing through the above-mentioned tip and forming a substantially non-zero angle β with the axis A, c) producing the centerbody.

Step a) may comprise sub-steps consisting in determining an annular region of separation of the flow of the gas stream acting on the exhaust centerbody by calculation, and in selecting the position on the axis A to be the axial position which is the furthest upstream in the region of separation. Said calculation may be made on the basis of a non-truncated exhaust centerbody. The exhaust centerbody having a truncated downstream part may have a total length along the axis A which is substantially equal to that of the centerbody that was used as the basis for the calculation.

DESCRIPTION OF THE FIGURES

The invention will be better understood and further details, features and advantages of the invention will become apparent upon reading the following description, given by way of non-limiting example, and with reference to the accompanying drawings, in which.

DETAILED DESCRIPTION

Figure 1:
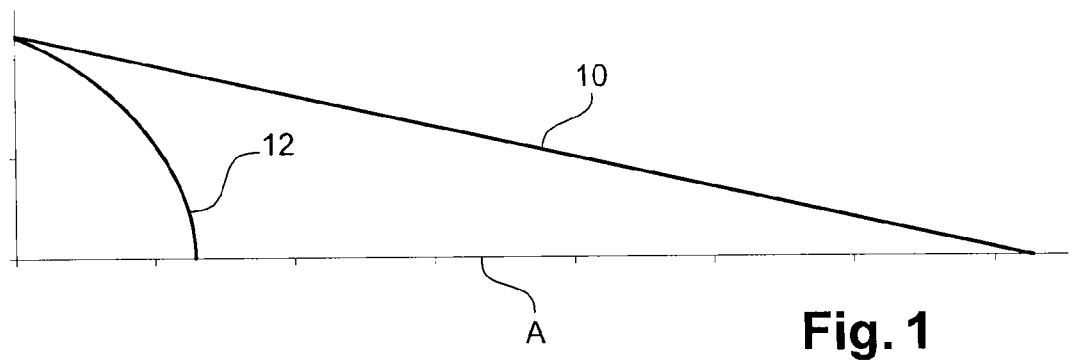
FIG. 1 is a highly schematic axial half-section of two exhaust bodies of a turbine engine, one conical and the other rounded.

FIG. 1 highly schematically shows exhaust centerbodies 10, 12 for turbine engines, such as aircraft turbojets or turboprop engines, the body 10 having a conical shape and the body 12 having a rounded shape. These bodies 10, 12 have rotational symmetry about a longitudinal axis A, the tips thereof being oriented downstream and the upstream ends thereof each being intended to be generally fixed to an exhaust housing of the turbine engine. Downstream and upstream refer to the direction of flow of the air in the turbine engine.

As explained above, the body 12, which has a smaller axial length or dimension, has the advantage of having a lower mass. However, this body 12 promotes the separations of the flow of the gas stream exiting the turbine engine, as shown in FIG. 2.

Figure 2:
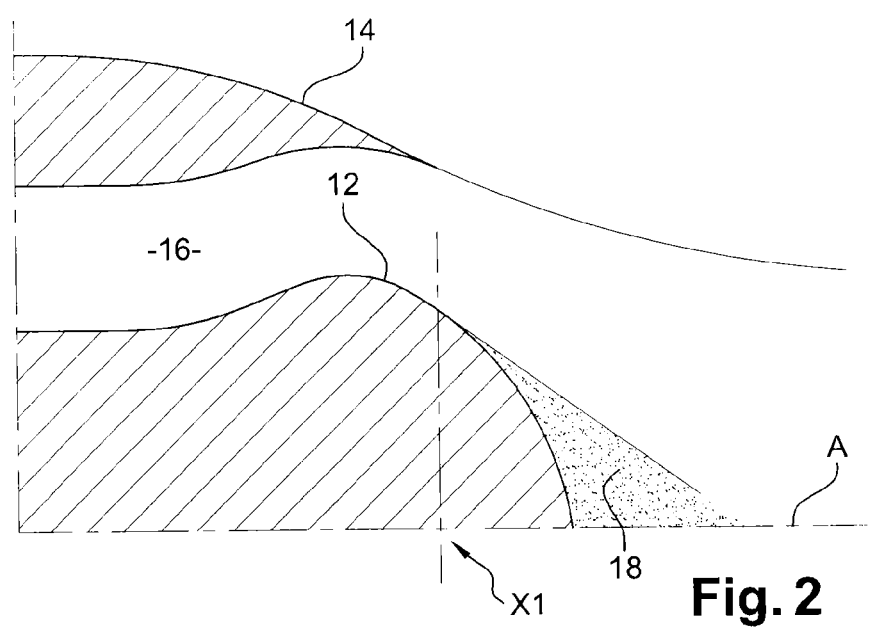
FIG. 2 is a schematic axial half-section of an exhaust body and of an exhaust nozzle of a turbine engine.

This FIG. 2 shows a rounded centerbody 12 surrounded by an exhaust nozzle 14 of the turbine engine, and which centerbody defines, together with this nozzle, an annular exhaust channel 16 for the combustion gases of the turbine engine. Reference numeral 18 designates the significant separations downstream of the centerbody 12 (obtained by a Mach field chart). These separations 18 affect the performance of the turbine engine and the front thereof (that is to say the axial position X1 which is furthest upstream in the separation region) tends to be displaced axially, thereby generating significant vibrations affecting the dynamics of the entire engine.

Figure 3:
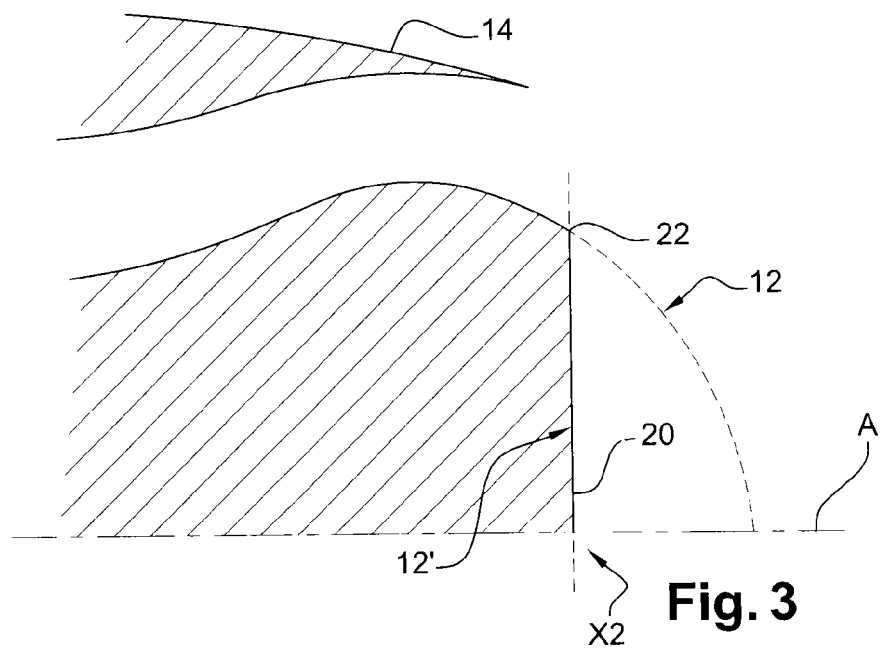
FIG. 3 is a schematic axial half-section of an exhaust body of a turbine engine, said body having a truncated downstream part.

The inventors noted that the front of the separation region could be prevented from being displaced by "fixing" it in the region of an annular ridge of the centerbody. For this purpose, and as schematically shown in FIG. 3, the downstream part of the centerbody 12 is truncated. In the example shown, the dotted lines delimit the contour of a centerbody 12 of the rounded type and the solid lines delimit the contour of the centerbody 12' having a truncated downstream part. Said centerbody 12' has a downstream radial face 20 having a circular contour which is connected by an annular ridge 22 to the upstream part of the body, of which the outer surface has a similar curvature to that of the upstream part of the body 12 in FIG. 2.

The ridge 22 extends around the axis A and clearly marks a discontinuity between the curvature of the outer surface of the upstream part and that of the downstream part. It is intended to cause a separation of the flow of the gas stream, of which the front is thus positioned axially (at X2) in a precise manner and substantially cannot be displaced axially.

In practice, the axial position X2 of the ridge 22 on the centerbody 12' is determined by calculation. In a first time period, it is necessary to determine the behaviour of the body 12' at different points of flight (take-off, landing, cruising) and to determine therefrom the axial position which is the furthest upstream of the front of the separation region. The ridge 22 is thus axially positioned in this axial position or slightly upstream of this position.

Figure 4:
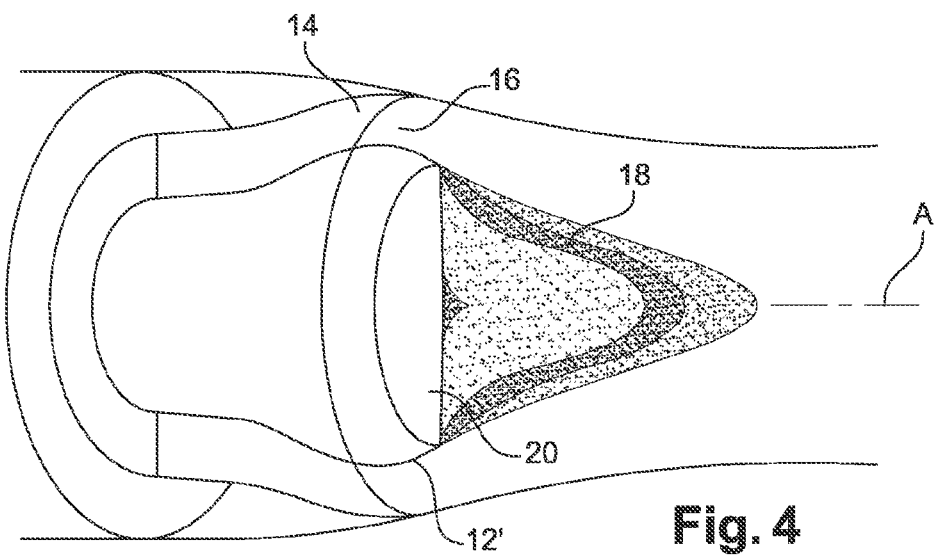
FIG. 4 is a schematic perspective view of the separations of the flow of the stream around the exhaust body having a truncated downstream part.

FIG. 4 is a Mach field chart for a truncated centerbody 12'.

The inventors optimised the shape of the truncated downstream part of the centerbody so as to optimise the performance of the turbine engine and in particular to improve the aerodynamic performance thereof by maximising in particular the pressure recovery on the body.

Figure 5:
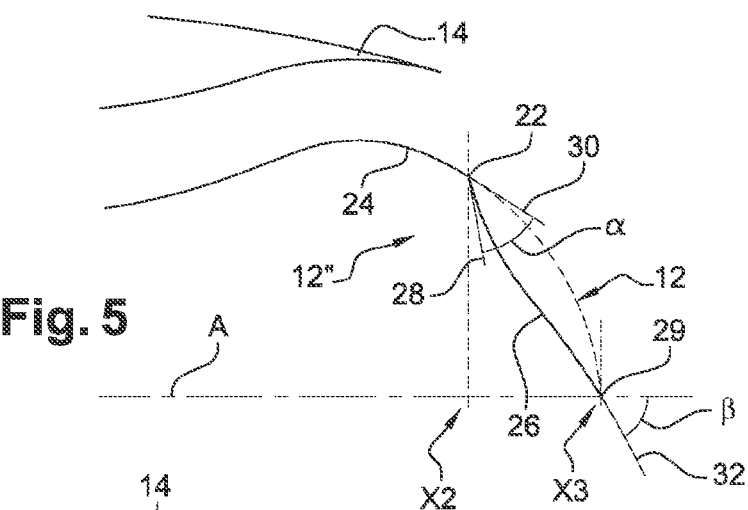
FIG. 5 is a schematic axial half-section of an exhaust body of a turbine engine according to the invention.
Figure 6:
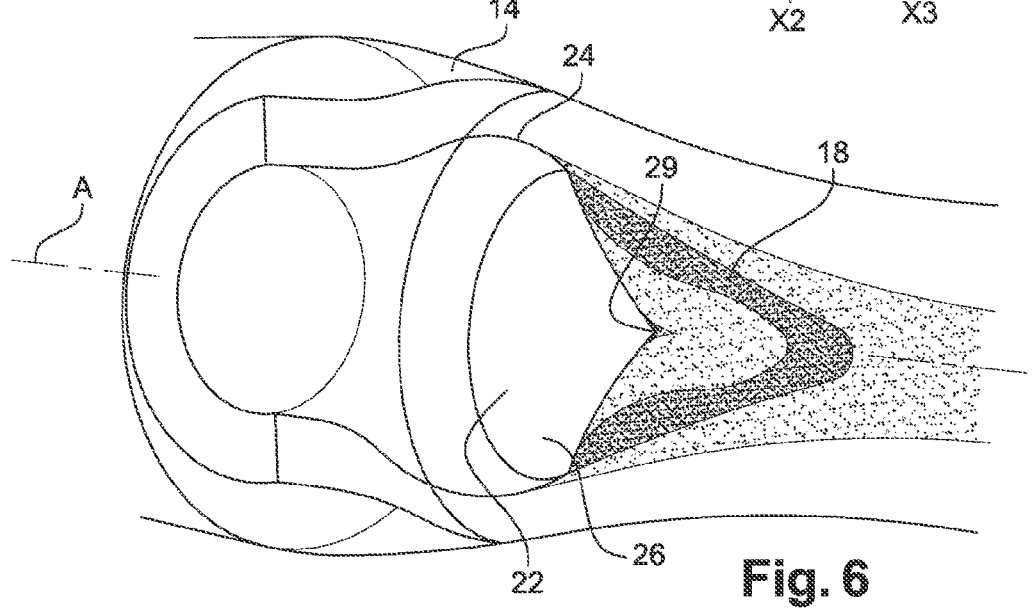
FIG. 6 is a schematic perspective view of the separations of the flow of the stream around the exhaust body according to the invention.

FIGS. 5 and 6 show a centerbody 12" optimised according to the invention. The upstream part 24 of the body 12" may be identical to an annular part of a centerbody 12 from the prior art. The downstream part 26 is connected at its upstream end to the upstream part 24 by a ridge 22 of the type described above, which has an axial position X2 determined as explained above. The shape and design of this downstream part 26 will be described in detail in the following. The ridge 22 may be sharp or may have a rounded, convex cross section.

The axial length of the centerbody 12" according to the invention may be identical to that of the rounded centerbody 12 from the prior art. In this case, and as schematically shown in FIG. 5, the tip of the truncated downstream part 26 of the body 12" has an axial position X3 which is identical to that of the tip of the body 12.

The downstream part 26 of the body 12" has a conical general shape of which the tip 29 is oriented downstream. The intersection between a plane passing through the axis A and the outer surface of this downstream part 26 is a line of which the upper half (shown in FIG. 5) is symmetrical to the lower half thereof about the axis A, owing to the rotational symmetry of the body 12" about the axis A.

The part of this line shown in FIG. 5 comprises a radially outer upstream end part which extends radially towards the inside and downstream from the ridge 22 and which is tangential to a straight line 28 passing through the ridge 22 and forming an angle α with a tangent 30 to the outer surface of the upstream part 24, in the region of the ridge 22. The radially inner downstream end part of the line extends radially towards the outside and upstream from the tip 29, and is tangential to a straight line 32 passing through the tip and forming an angle β with the axis A. In this case, the ridges are measured from downstream.

The above-mentioned line has a generally undulating shape which is obtained by polynomial interpolation, for example by means of a Bézier curve. In the example shown, the upstream end part of the line has a concavity oriented downstream and the downstream end part of said line has a convexity oriented downstream.

In a particular and non-limiting embodiment of the invention, the angle α is approximately 45° and the angle β is approximately 61°.

Performance calculations showed that the centerbody 12″ has better aerodynamic performance and a better thrust coefficient than the body 12′, in particular because the pressure recovery is greater on this body 12″. FIG. 6 is a Mach field chart of an exhaust centerbody 12″ according to the invention.

Figure 7:
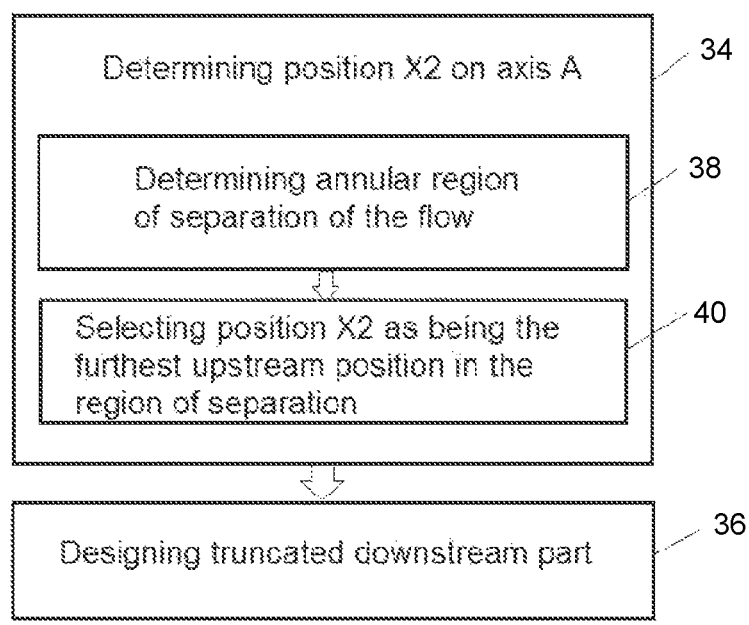
FIG. 7 is a flow diagram showing the steps of the method according to the invention.

FIG. 7 shows an embodiment of the method according to the invention, which essentially comprises two steps 34 and 36.

The step 34 consists in particular in determining the position X2 on the axis A, downstream of which the body 12″ comprises the truncated part 26 and in the region of which the body has the annular ridge 22. This step 34 may comprise two sub-steps 38, 40 consisting in particular in determining an annular region of separation of the flow of the gas stream acting on the body by calculation, and in selecting the position X2 on the axis A to be the axial position which is the furthest upstream in the region of separation.

The step 36 consists in particular in designing the truncated downstream part of the body, as described above.

The invention claimed is:

1. An exhaust centerbody for a turbine engine, having rotational symmetry about a longitudinal axis A, comprising:
   an upstream annular part; and
   a downstream annular part, said downstream annular part being connected to the upstream annular part by an annular ridge marking a discontinuity in curvature between outer surfaces of the upstream and downstream annular parts, the outer surface of the downstream annular part having a substantially conical general shape, of which a tip is oriented downstream and is positioned substantially in a region of the axis A,
   an axial half-section of the outer surface of the downstream annular part defining a line of which an upstream end part is substantially tangential to a first straight line passing through the annular ridge and forming a non-zero angle α with a tangent to the outer surface of the upstream annular part, in a region of the annular ridge, a downstream end part of said line being substantially tangential to a second straight line passing through the tip and forming a substantially non-zero angle β with the axis A,
   wherein the upstream end part of the line has a concavity oriented downstream and the downstream end part of said line has a convexity oriented downstream; and
   wherein the tangent to the outer surface of the upstream annular part intersects the axis A at a location downstream of the tip.

2. The centerbody according to claim 1, wherein the line has a substantially undulating shape.

3. The centerbody according to claim 1, wherein at least one of the angle α is between 20 and 90° and the angle β is between 10 and 90°.

4. A turbine engine comprising a centerbody according to claim 1.

5. A method for producing an exhaust centerbody for a turbine engine, said centerbody having rotational symmetry about a longitudinal axis A, the method comprising:
   a) determining a position on the axis A, upstream of which the centerbody will comprise an upstream annular part, downstream of which the centerbody will comprise a downstream annular part and in a region of which the centerbody will have an annular ridge marking a discontinuity in curvature between outer surfaces of the upstream and downstream annular parts of the centerbody;
   b) designing the downstream annular part of the body, the outer surface of the downstream annular part having a substantially conical general shape, of which a tip is oriented downstream and is positioned substantially in a region of the axis A, an axial half-section of the outer surface of the downstream annular part defining a line of which an upstream end part is substantially tangential to a first straight line passing through the annular ridge and forming a non-zero angle α with a tangent to the outer surface of the upstream annular part, in a region of the ridge, and of which a downstream end part is substantially tangential to a second straight line passing through the tip and forming a substantially non-zero angle β with the axis A, the upstream end part of the line having a concavity oriented downstream and the downstream end part of said line having a convexity oriented downstream, the tangent to the outer surface of the upstream annular part intersecting the axis A at a location downstream of the tip; and
   c) producing the centerbody.

6. The method according to claim 5, wherein step a) comprises sub-steps including determining an annular region of separation of a flow of a gas stream acting on the exhaust centerbody by calculation, and selecting the position on the axis A to be an axial position which is furthest upstream in the region of separation.

7. The method according to claim 5, wherein the line is obtained by polynomial interpolation.

\* \* \* \* \*